United States Patent
Gillessen et al.

(10) Patent No.: US 11,001,015 B2
(45) Date of Patent: May 11, 2021

(54) DIAPHRAGM TOOL FOR FORMING REINFORCEMENT FIBER TIERS INTO PREFORMED T-SHAPED PROFILES

(71) Applicant: Airbus Operations GmbH, Hamburg (DE)

(72) Inventors: Alexander Gillessen, Hamburg (DE); Jorve Kohls, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 499 days.

(21) Appl. No.: 15/851,128

(22) Filed: Dec. 21, 2017

(65) Prior Publication Data

US 2018/0186105 A1    Jul. 5, 2018

(30) Foreign Application Priority Data

Dec. 30, 2016    (DE) .................. 102016125959.4

(51) Int. Cl.
*B29C 70/44*    (2006.01)
*B29C 70/34*    (2006.01)
*B29C 43/36*    (2006.01)
*B30B 5/02*    (2006.01)
*B29C 65/00*    (2006.01)

(52) U.S. Cl.
CPC ........ *B29C 70/44* (2013.01); *B29C 66/81455* (2013.01); *B29C 70/342* (2013.01); *B29C 2043/3647* (2013.01); *B30B 5/02* (2013.01)

(58) Field of Classification Search
CPC . B29C 70/44; B29C 70/342; B29C 66/81455; B29C 43/3642; B29C 2043/3644; B29C 2043/3649
See application file for complete search history.

(56) References Cited

U.S. PATENT DOCUMENTS

| | | | | |
|---|---|---|---|---|
| 6,701,990 | B1* | 3/2004 | Burley | B29D 99/0003 156/463 |
| 2003/0173774 | A1* | 9/2003 | Reynolds, Jr. | B29C 33/505 285/55 |
| 2004/0265536 | A1 | 12/2004 | Sana et al. | |
| 2008/0115555 | A1* | 5/2008 | Depase | B29C 70/345 72/343 |
| 2010/0136293 | A1* | 6/2010 | Kubryk | B29C 70/202 428/156 |

FOREIGN PATENT DOCUMENTS

EP    1481790    12/2004

* cited by examiner

*Primary Examiner* — Marc C Howell
*Assistant Examiner* — Nicholas J Chidiac
(74) *Attorney, Agent, or Firm* — Greer, Burns & Crain, Ltd.

(57) ABSTRACT

A tool for shaping non-cured reinforcement fibers into a substantially T-shaped profile, comprising a web-shaping tool and a forming tool, wherein the forming comprises an inflatable diaphragm.

17 Claims, 1 Drawing Sheet

DIAPHRAGM TOOL FOR FORMING REINFORCEMENT FIBER TIERS INTO PREFORMED T-SHAPED PROFILES

CROSS-REFERENCES TO RELATED APPLICATIONS

This application claims the benefit of the German patent application No. 10 2016 125 959.4 filed on Dec. 30, 2016, the entire disclosures of which are incorporated herein by way of reference.

FIELD OF THE INVENTION

The present invention relates to a tool for forming a T-shaped profile and/or a non-cured T-shaped preformed profile from reinforcing fibers, and to a method for producing such profiles.

BACKGROUND OF THE INVENTION

In the production of aircraft, the lightweight construction using fiber composite materials has significant importance in terms of economy and cutting back on CO2 in the operation of an aircraft. In particular, fiber composite materials based on carbon fibers (CRP, CFRP) have reached a significant importance in the production of aircraft. Fiber composite materials have reinforcement fibers which are embedded in a cured matrix material. A difference is made herein between the use of pre-impregnated fibers (prepregs) in which the fibers are finished with a curable matrix material (resin), and dry fibers to which the curable matrix material (resin) is added later. The fibers are in most instances processed in the form of various pre-fabricated semi-finished products, such as mats, woven fabrics, fiber strands. The forming of fiber tiers that have been deposited in a flat manner, thus stacked, into the desired geometry of the semi-finished product (pre-shaping or pre-forming) is an important method step. The pre-forming of semi-finished products from a composite material is generally divided into the sub-classes of discontinuous and continuous production methods. Longitudinal stiffening elements of aircraft structural components are also referred to as stringers. The latter are reinforcement profiles which have various shapes and can be a-shaped, H-shaped, or T-shaped, for instance. Stringers can be of various width and thickness and follow the shape of an aircraft structural component, thus be shaped in a complex three-dimensional manner. The term three-dimensional in industrial use herein is only used when the stringers that are already inherently three-dimensional are not straight or linear ("two-dimensional") but have bends. T-shaped profiles have a web and feet, so as to correspond to the downward stroke and the cross stroke of the letter "T". The web and the feet herein are not necessarily at right angles, but can rather be mutually aligned at a more or less oblique angle.

Such profiles can furthermore be produced from a prepreg or dry fiber material. Roller-press or press-mold processes are known for the production of preformed T-profiles. These processes are not easy to manage when stringers having highly complex geometries or very thick stringers have to be produced, on account of which the processes can be cost intensive and slow.

EP 1481790 A2 herein discloses a method and a tool for shaping supports from composite materials.

A machine having rollers for shaping impregnated woven fabric is disclosed in US 006701990 B1.

SUMMARY OF THE INVENTION

Pursuant to all the above, it has emerged in a manner that is surprising and unforeseeable to a person skilled in the art that a tool for shaping at least two tiers of non-cured reinforcement fibers into a substantially T-shaped profile, comprising a web-shaping tool and a forming tool, characterized in that the web-shaping tool is suitable for fixing a first part of the tiers of the reinforcement fibers, and the forming tool is suitable for dividing a second part of the tiers of reinforcement fibers into two regions and for shaping the latter, wherein the web-shaping tool is a two-part tool which can clamp and press the first part of the tiers of reinforcement fibers across the full area, the forming tool comprising a means for dividing a second part of the tiers of reinforcement fibers and an inflatable diaphragm that substantially encloses the means can remedy the disadvantages of the prior art. The web-shaping tool herein can include the entire geometry of the desired component. The diaphragm tool ensures a smooth contact between the fiber tiers and thus a very gentle forming process. Highly complex, also three-dimensional, stringer geometries can be implemented. The tool can be used in a continuous process.

It is preferable for the web-shaping tool to include a heating system so as to activate the binding agent that is included in the fiber tiers, if required. The heating system can be heating ducts through which a medium is directed, or a heating by way of induction or infrared radiation. It is furthermore preferable in the case of a tool according to the invention for the means for dividing a second part of the tiers of reinforcement fibers to represent a guide plate. Such a guide plate first enables the assembly of the diaphragm and permits the free tiers to be divided prior to the forming process. It is furthermore preferable for the inflatable diaphragm to have at least one internal diaphragm. The sequential or continuous, respectively, inflation of the diaphragm, proceeding from the guide plate toward the external foot regions of the stringer can be achieved on account thereof. It is furthermore preferable for the internal diaphragm or the internal diaphragms to have, in each case, one hole. On account thereof, access for air can be provided on the internal chambers (those that bear directly on the guide plate). By way of one or a plurality of small holes in the flow direction to the next diaphragm segment it can be achieved that the diaphragm segments, on account of the lower flow rate, inflate more slowly. The entire diaphragm can thus be inflated from the inside to the external stretches of the foot. In one further embodiment, the holes between the diaphragms can be absent, the individual chambers of the diaphragm having dedicated connectors and being able to be filled sequentially with temperature-controlled gas such as warm air. It is thus furthermore preferable for heated air to be able to flow through the hole or the holes of the internal diaphragm or diaphragms. It is furthermore preferable for the region that bears on the fiber tiers to be perforated. Temperature-controlled gas can flow to the fiber tiers on account thereof, and if required activate the binding agent that is included in the fiber tiers. On the other hand, the perforation has to be dimensioned such that the diaphragm can be brought to bear on the guide plate by applying a vacuum. It is furthermore preferable for the inflatable diaphragm to have at least one means for heating the enclosed air. Alternatively, the air that has been inducted can be heated. It is furthermore preferable for an auxiliary platform which contacts the second part of the tiers of reinforcement fibers to be disposed beside the web-shaping tool. On account thereof, the fiber tiered stack, or the fiber tiered stack that is divided into two halves, respectively, can be held until the web-press-mold tool engages when the fiber stack is being inserted. The platform can subsequently be removed since the lower part then no longer has to be held. The lower part is anyway formed in a downward manner in the course of the process, while the upper part is held by the guide plate. The invention also comprises a method for producing a substantially T-shaped preformed profile from non-cured reinforcement fibers, wherein a tool as described above is used, the method comprising the following method steps:

a) depositing a stack from at least two layers of non-cured reinforcement fibers;
b) fixing a first part of the deposited stack by way of a web-shaping tool while forming the web of the T-shaped profile;
c) dividing a second part of the deposited stack into two part-stacks by introducing a forming tool into the second part of the stack;
d) shaping the feet of the T-shaped profile by inflating the diaphragm. In one further embodiment, the method also comprises e) inducing heat (in the case of dry fibers) for activating the binding agent. In one further embodiment, two fiber tiered stacks can also be inserted, and the tool can be moved in after the first fiber tiered stack has been inserted, such that the second fiber tiered stack can be placed onto the guide plate. Complex dividing of the two halves of a fiber tiered stack is thus no longer necessary. It is preferable herein for the gas that is used for inflating the diaphragm to be heated. A heated fluid can be used to this end. The entire diaphragm, in the case of warm air being used, can also have a perforation at the contact point with the material. On account thereof, the material can be perfused by warm air, and the binding agent can thus also be activated in the deep regions even in the case of large material thicknesses. The invention also comprises a cured T-shaped profile, obtainable by such a method, in as far as pre-impregnated fibers (prepregs) are used, and a not yet cured preformed profile, in as far as dry fibers are used.

The aspects described above, and further aspects, features, and advantages of the invention can likewise be derived from the examples of the embodiments which will be described hereunder with reference to the appended drawings.

Figures 1, 2:
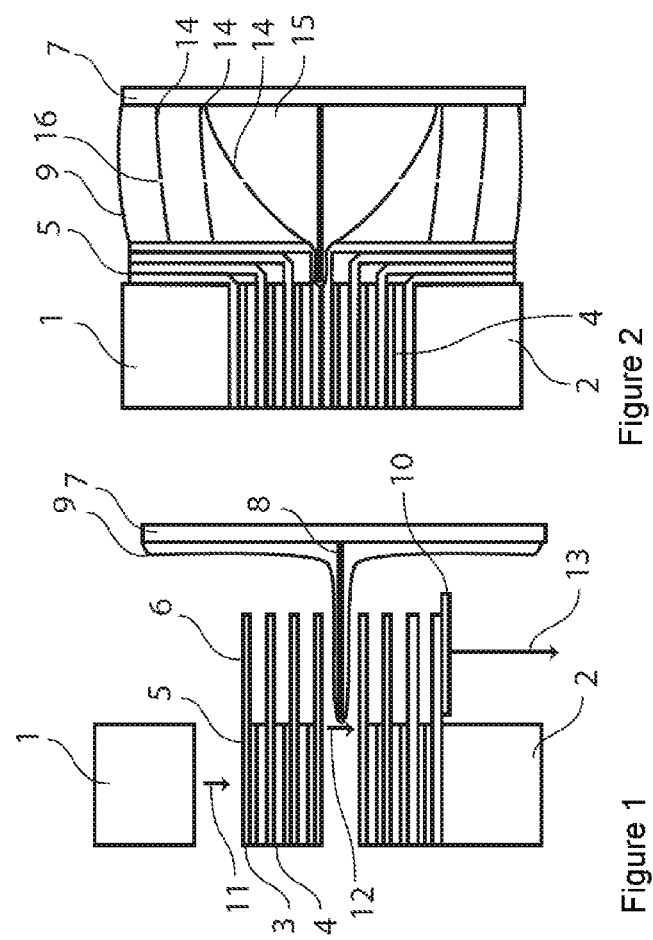
FIG. 1 shows the tiered stack to be shaped, and the tool, prior to a forming cycle.
FIG. 2 shows the shaped tiered stack and the tool after a forming cycle.

The same reference signs are used for identical or at least equivalent elements, components, or aspects in the figures. It is to be noted that embodiments which are merely illustrative and not limiting will be described in detail hereunder.

DETAILED DESCRIPTION OF THE PREFERRED EMBODIMENTS

FIG. 1 shows the tiered stack to be shaped, and the tool, prior to a forming cycle. The press tool is composed of an upper press tool (1) and of a lower press tool (2). The two press tools (1) and (2) at the same time form the web-shaping tool. The tiered stack is disposed between the upper and the lower press tool (1, 2) such that a first part of the tiered stack (5) is fixed by the press tool. A second part of the tiered stack (6) protrudes beyond the press tool (1, 2). This part is to be formed to be the feet of the T-profile. The tiered stack per se is composed of individual tiers (4) which form only the web and are short, and from longer tiers (3) which form both the foot as well as the web of the T-shaped profile. The foot of the T-shaped profile, in other words the cross stroke of the "T", is shaped from the second part of the tiered stack (6) with the aid of the forming tool. The forming tool has a diaphragm support (7), a guide plate (8), and a diaphragm (9). The diaphragm (9), by applying a vacuum, can tightly bear on the guide plate (8) and on the diaphragm support (7) prior to the commencement of the forming process. Furthermore, a holding plate (10) which prevents the second part of the tiered stack (6) from being deformed by gravity can be provided. The first part of the tiered stack (5) is moved together (12) and compressed by converging the press tool parts (1) and (2). The guide plate (8) and the diaphragm (9) are partially enclosed by the tiered stack. The holding plate (10) is removed (13) from the effective range of the forming tool prior to the forming tool being activated.

FIG. 2 shows the shaped tiered stack and the tool after a forming cycle. Further details of the diaphragm are shown at the same time. The diaphragm (9) is inflated with gas as soon as the first part of the tiered stack (5) is fixed by the press tool (1, 2) and the web, in other words the vertical stroke of the "T", has been formed. The diaphragm has at least one internal diaphragm (14) such that a first diaphragm segment (15) is inflated first. Overall, three internal diaphragms (14) are shown here. The inflation of the first diaphragm segment (15) causes the tiers of the second part of the tiered stack (6), the tiers prior thereto having been aligned so as to be almost parallel, to bend and to be pressed onto the free end sides of the press tool (1, 2), thus forming the feet of the T-profile. The air can flow into the further diaphragm segments through the holes (16) in the internal diaphragms (14). On account thereof, the feet of the T-profile are pressed completely onto the free end side of the press tool (1, 2). The press tool (1, 2) can be heatable or be embodied such that an input of heat into the component is enabled, for instance by induction or infrared radiation. If the fiber tiers are finished with a binding agent, for example thermoplastic binding agent, the web can thus be thermoplastically fixed by the press tool (1, 2), on the one hand, and the feet of the T-shaped profile can be thermoplastically fixed by injecting air that has been suitably temperature controlled into the diaphragm (9). The holes (16) in the internal diaphragms herein are dimensioned such that a sufficient flow of temperature-controlled gas, such as air, flows through the forming tool. Furthermore, that part of the diaphragm that comes in contact with the feet of the T-shaped profile can be finely perforated. On account thereof, heat can be transmitted to the preformed profile in order for the binding agent to be activated. The perforation herein is dimensioned such that the diaphragm (9) can be successfully fixed to the guide plate (8) and to the diaphragm support (7), as is shown in FIG. 1. It is a great advantage of such a tool that the latter can be applied in a very flexible manner for all T-stringers. Moreover, comparatively shorter process times can be achieved herein since the forming process can be carried out in a rapid manner and the induction of heat by way of the perforation is particularly good. This moreover is a very uncomplicated and single-stage process.

While the invention has been illustrated and described in detail in the drawings and the above description, it is intended that such illustrations and descriptions are merely illustrative or exemplary and non-limiting, and therefore the invention is not restricted by the disclosed embodiments. In the claims, the word "having" does not exclude other elements, and the word "one" or the indefinite article "a" does not exclude a greater number.

The mere event that certain features are specified in different dependent claims does not restrict the subject matter of the invention. In addition, combinations of these features can advantageously be used.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A tool for shaping at least two stacked tiers of non-cured reinforcement fibers into a substantially T-shaped profile comprising a web and feet, comprising:
   a web-shaping tool, and
   a forming tool,
      the web-shaping tool being configured to fix a first part of the tiers of reinforcement fibers,
      the forming tool being configured to divide a second part of the tiers of reinforcement fibers into two regions and to shape the two regions,
      the web-shaping tool comprising a two-part press tool configured to clamp and press the first part of the tiers of reinforcement fibers across a full area of the first part, and
      the forming tool comprising a means for being inserted between tiers of and dividing a second part of the stacked tiers of reinforcement fibers and an inflatable diaphragm substantially enclosing said means, said web-shaping tool being located entirely outside of said diaphragm.

2. The tool according to claim 1, wherein the inflatable diaphragm comprises at least one heater arranged to heat the enclosed air.

3. The tool according to claim 1, further comprising an auxiliary platform arranged to contact and support the second part of the tiers of reinforcement fibers and being disposed beside the web-shaping tool.

4. The tool according to claim 1, wherein the diaphragm is configured to be inserted between tiers of the second part of the stacked tiers of reinforcement fibers along with said means.

5. The tool according to claim 1, wherein the inflatable diaphragm has at least one internal diaphragm.

6. The tool according to claim 5, wherein the at least one internal diaphragm has one hole therethrough.

7. The tool according to claim 6, wherein the inflatable diaphragm has multiple internal diaphragms, the hole in each of the at multiple diaphragms is sized to allow air to flow therethrough.

8. A tool for shaping at least two tiers of a stack of non-cured reinforcement fibers into a substantially T-shaped profile comprising a web and feet, comprising:
   a web-shaping tool, and
   a forming tool,
      the web-shaping tool being configured to fix a first part of the stacked tiers of reinforcement fibers,
      the web-shaping tool comprising a two-part press tool configured to clamp and press the first part of the stacked tiers of reinforcement fibers across a full area of the first part, and
      the forming tool comprising a guide plate comprising a plate structure with oppositely facing sides configured to be inserted between tiers of a second part of the stacked tiers of reinforcement fibers, to divide the second part of the stacked tiers into two regions on the oppositely facing sides of the plate structure, and to shape the two regions of the second part of the stacked tiers of reinforcement fibers and an inflatable diaphragm substantially enclosing said guide plate,
   wherein the web-shaping tool is located entirely outside of said diaphragm.

9. The tool according to claim 8, wherein the inflatable diaphragm has at least one internal diaphragm.

10. The tool according to claim 8, wherein the inflatable diaphragm comprises at least one heater arranged to heat the enclosed air.

11. The tool according to claim 8, further comprising an auxiliary platform arranged to contact and support the second part of the tiers of reinforcement fibers and being disposed beside the web-shaping tool.

12. The tool according to claim 8, wherein the diaphragm is borne on the guide plate to be inserted between tiers of the second part of the stacked tiers of reinforcement fibers along with the guide plate.

13. The tool according claim 8, wherein the inflatable diaphragm has multiple internal diaphragms, each of the internal diaphragms has one hole therethrough.

14. The tool according to claim 13, wherein the hole in each of the multiple internal diaphragms is sized to allow air to flow therethrough.

15. A method for producing a substantially T-shaped preformed profile from non-cured reinforcement fibers, wherein the tool according to claim 1 is used, said method comprising:
   a) depositing a stack of at least two layers of non-cured reinforcement fibers;
   b) fixing the first part of the deposited stack with the web-shaping tool to form the web of the T-shaped profile, while maintaining the web-shaping tool outside of the diaphragm;
   c) dividing the second part of the deposited stack into two part-stacks by introducing the forming tool into the second part of the stack;
   d) shaping the feet of the T-shaped profile by inflating the diaphragm with a fluid, while continuing to maintain the web-shaping tool completely outside of the diaphragm.

16. The method according to claim 15, wherein the fluid used for inflating the diaphragm is heated.

17. A T-shaped profile, obtained by a method according to claim 15.

* * * * *